(12) United States Patent
Cruz-Uribe et al.

(10) Patent No.: US 7,072,108 B2
(45) Date of Patent: *Jul. 4, 2006

(54) ENHANCED CONTRAST PROJECTION SCREEN

(75) Inventors: Antonio S. Cruz-Uribe, Corvallis, OR (US); William J. Allen, Corvallis, OR (US); John Christopher Rudin, Bristol (GB); Andrew Arthur Hunter, Bristol (GB); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/976,222

(22) Filed: Oct. 26, 2004

(65) Prior Publication Data

US 2005/0057803 A1  Mar. 17, 2005

Related U.S. Application Data

(63) Continuation of application No. 10/386,047, filed on Mar. 10, 2003, now Pat. No. 6,853,486.

(51) Int. Cl.
*G03B 21/56* (2006.01)
*G02F 1/135* (2006.01)
*G02F 1/03* (2006.01)
*C09K 19/00* (2006.01)

(52) U.S. Cl. .............. 359/443; 359/452; 359/454; 359/459; 349/24; 349/33; 430/20; 345/84

(58) Field of Classification Search ............... 359/443, 359/449, 452, 454, 459; 349/1, 6–9, 24, 349/33; 430/20; 345/84
See application file for complete search history.

(56) References Cited

U.S. PATENT DOCUMENTS

| | | | | |
|---|---|---|---|---|
| 5,625,489 | A | * | 4/1997 | Glenn ........................ 359/455 |
| 6,538,814 | B1 | * | 3/2003 | Hunter et al. ................ 359/449 |
| 6,680,579 | B1 | * | 1/2004 | Allen et al. ................ 315/169.3 |
| 6,853,486 | B1 | * | 2/2005 | Cruz-Uribe et al. ......... 359/443 |
| 2002/0196216 | A1 | * | 12/2002 | Tokuyo et al. ................ 345/84 |

* cited by examiner

*Primary Examiner*—W. B. Perkey
*Assistant Examiner*—Magda Cruz (57) ABSTRACT

A projection screen is provided that includes a display surface having a plurality of elements. Each element has an optical property that is responsive to an appropriate applied voltage. The display surface may be configured so that the optical properties of each element may be coordinated with the projected image.

24 Claims, 5 Drawing Sheets

ENHANCED CONTRAST PROJECTION SCREEN

CROSS-REFERENCE TO RELATED APPLICATIONS

This is a continuation of copending application No. 10/386,047 filed on Mar. 10, 2003, now U.S. Pat. No. 6,853,486, which is hereby incorporated by reference.

BACKGROUND

Image projection systems may be used to display a still or video image, and to enable the image to be viewed simultaneously by a large or small audience. A screen useful for displaying a projected image may be as simple as a reflective surface. However, the appearance of a projected image on such surfaces may be pale or washed-out, typically due to ambient light. This poor image contrast may be improved by viewing the image in a darkened room, but it is not always possible or desirable to darken the room where an image is being displayed. Similarly, the quality of the projected image may be improved by employing a screen having a somewhat reflective surface. Such screen surfaces may incorporate a reflective material whose reflectance decreases rapidly as the angle to the projected image increases, so that light directed directly to the screen surface is strongly reflected toward the viewer, while ambient light impinging on the screen surface at an angle is reflected away from the viewer. However, such screen surfaces may offer only a narrow range of satisfactory viewing angles, and, where ambient light impinges on such a screen from the same direction as the projected image, the advantage of such a screen may be lost as the ambient light is also reflected to the viewer.

SUMMARY

A projection screen is provided that includes a display surface having a plurality of elements. Each element has an optical property that is responsive to an appropriate applied voltage. The display surface may be configured so that the optical property of each element may be coordinated with the projected image.

DETAILED DESCRIPTION

Figure 1:
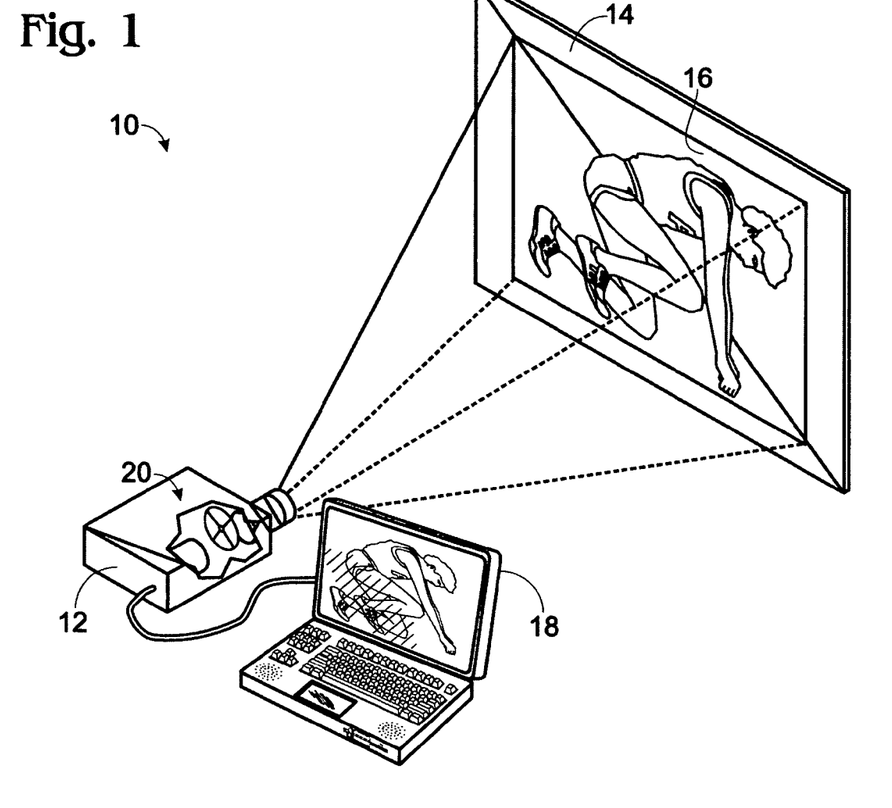
FIG. 1 is a view of a display system according to an embodiment of the invention.

Referring initially to FIG. 1, a display system according to an embodiment of the present invention is shown generally at 10. Specifically, FIG. 1 illustrates a display system including a projector 12 and a variable-reflectivity projection screen 14, where the projector is adapted to project an image 16 onto the projection screen. The projector is typically associated with a source of image data, for example an associated processor, depicted in FIG. 1 as a laptop computer 18. Projector 12 thus may be configured to project an image 16 corresponding to image data received from computer 18 onto projection screen 14.

Projector 12 is depicted as a front projection system, however many types of projection systems may be suitable for use with a projection screen of the invention, including both front and rear projection devices. In a front projection system as shown in FIG. 1, the viewer typically is located on the same side of the screen as the projector and the projector is spaced-apart and separate from the screen. In a rear projection system, the viewer typically is located on the opposite side of the screen as the projector, the projector is spaced-apart and separate from the screen, and the projected image is viewed through an at least partially light transmissive screen.

The projector may take the form of a digital projector, or any other suitable projection device. Projector 12 typically includes a light engine 20. Light engine 20 typically configured to direct and transmit light to projection screen 14 to generate a projected image that corresponds to the image data received from computer 18. For example, and as described in more detail below, light engine 20 may be any suitable illumination source adapted to optically address projection screen 14, including single white light sources (such as a mercury lamp, plasma lamp, incandescent lamp, etc.) and/or multiple white or single color light sources (such as light emitting diodes (LEDs), laser diodes, etc.). Additionally, projector 12 may include optics, spatial light modulators, scanning mirrors, focusing devices, color-generation devices, controllers, etc. The images projected by the image projector may include still images or video images. Both still and video images will be referred to herein simply as projected images.

Figure 2:
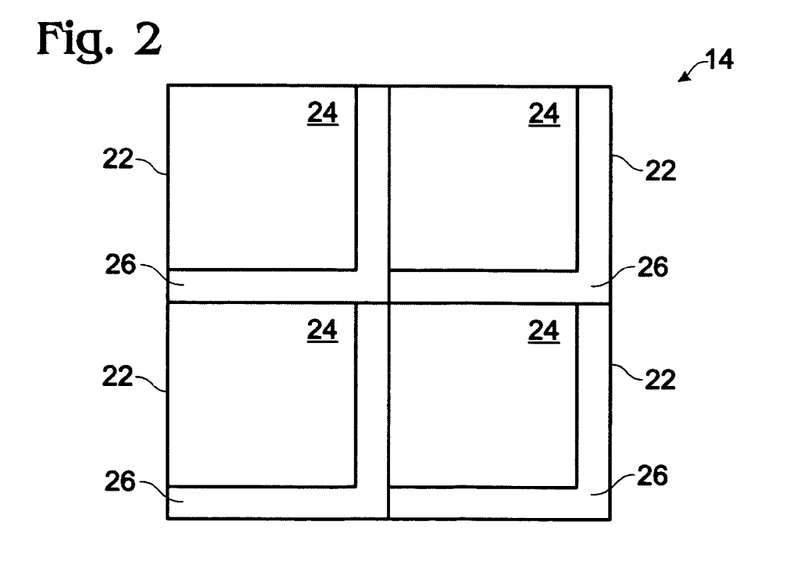
FIG. 2 is a partial view of a display surface of a projection screen according to an embodiment of the invention.

A projection screen may incorporate a plurality of display elements, each display element including at least one active pixel element. One or more optical properties of each pixel element may be individually modified, so that the projection screen may exhibit the desired variable reflectivity (in the case of front projection) or variable transmissivity (in the case of rear projection). As shown in FIG. 2, front projection screen 14 incorporates a plurality of display elements 22, each display element including at least one active pixel element 24. The reflectivity of each pixel element 24 may be individually modified. Each display element may include a single pixel element, or a plurality of pixel elements, and may include a bias region 26. The bias region may occupy a portion of the perimeter of the display element, may occupy one edge of the display element, or may be placed within the active pixel region of the display element. The reflectivity of the bias region may be fixed at the time of projection screen manufacture, or may be adjusted to one or more constant values.

The display elements of projection screen 14 are typically sized small enough that individual display elements are below the threshold of detectability for a viewer of the projection screen. For example, where the projected image is selected to be one meter by one meter in size, a display element may be on the order of one square millimeter. Similarly, where the projected image is a two meter by two meter image, each display element may be four square millimeters (2 mm×2 mm). The bias region, when present, may occupy for example 5% of the area of the display element.

The reflectivity of each pixel element 24 may be adjusted between a state of higher reflectivity and a state of lower reflectivity by applying an appropriate voltage to the pixel element. By setting the reflectance state of a particular pixel element to correspond with the brightness of the portion of the projected image incident upon that pixel element, the contrast of the projected image may be enhanced. It should be appreciated that regions of the projected image that have a high luminance value (i.e. that are brighter) may benefit from projection onto pixel elements exhibiting a high reflectance. Similarly, images of the projected image having lower luminance values (i.e. that are darker) may benefit from projection onto pixel elements exhibiting a lower reflectance state. As a result, the bright portions of the image may appear brighter, and the dark portions may appear darker, and the apparent contrast of the projected image may be thereby enhanced. The active display surface described herein may therefore be used to enhance the contrast of an image projected thereon, by coordinating the reflectivity of the display surface with the content of the projected image.

The enhanced contrast of the projected image that may result from the use of an enhanced projection screen as described herein may improve the quality of the displayed image, for example in conditions of low ambient light. Alternatively, or in addition, the resulting enhanced contrast may functionally reduce the color requirements for the light engine. That is, coordination of the projected image with an enhanced projection screen may permit an otherwise lower powered and/or less intense light engine to yield a satisfactory projected image.

Figure 3:
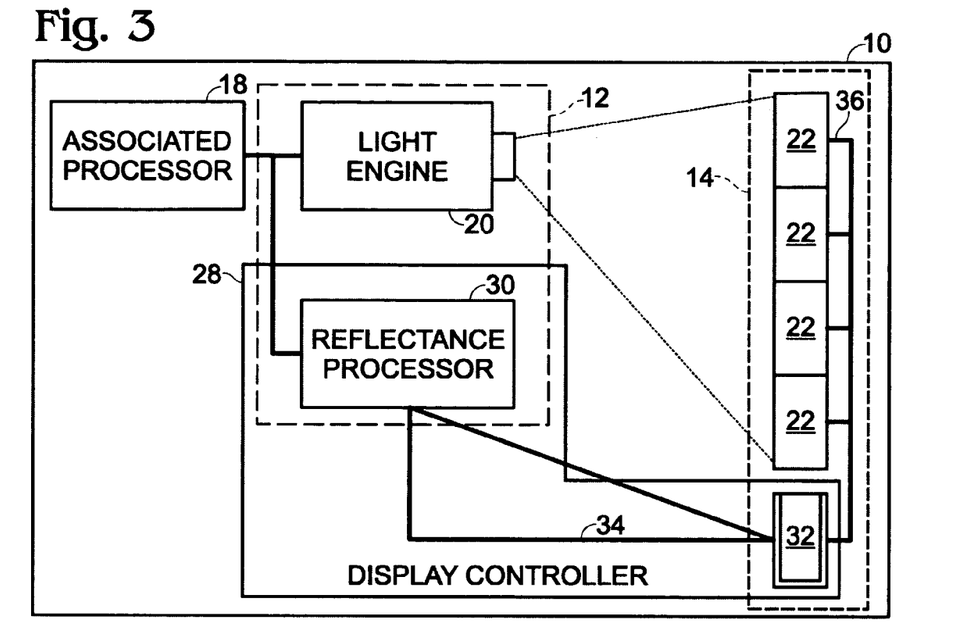
FIG. 3 is a schematic representation of the display system of FIG. 1.

As shown schematically in FIG. 3, display system 10 may include a display controller 28 configured to alter the reflectivity of display surface 14 in coordination with the image displayed thereon, by selectively altering the reflectivity of individual display elements 22 to correspond with the content of the projected image incident upon that individual pixel element. Any device or mechanism capable of modulating the reflectivity of the pixel elements in the display surface in order to achieve coordination with the projected image is a suitable display controller. The display controller may include one or more components, for example including a reflectance processor 30 configured to convert the image data for the projected image into reflectance data for the projection screen, and an electrode controller 32 configured to apply an appropriate voltage to the electrodes of the pixel elements in order to modify the reflectivity of that particular pixel element to match the reflectance state specified by the reflectance processor. By "appropriate voltage" is meant an applied potential having a polarity and magnitude sufficient to modify the reflectivity of the particular pixel element in order to create the desired reflectance state in the pixel element.

Reflectance processor 30 may receive the same image data used by light engine 20 to generate the projected image, and may convert the image data into corresponding pixel element states. Reflectance processor 30 may be incorporated within projector 12, as shown in FIG. 3, or the reflectance processor may be incorporated in associated processor 18. Alternatively, the reflectance processor may be associated with projection screen 14 itself, either as a separate device, or incorporated with the projection screen, for example combined with the electrode controller.

The image data for a full color image may be converted by the reflectance processor into an approximately grayscale image by dithering the image using black and white pixels, where the black and white pixels may then be mapped to the high reflectance and low reflectance states of the pixel elements of the display surface. The resulting gray-scale image may then enhance the contrast of the image projected onto the display surface. Alternatively, the desired image may include gray tones created by rapidly switching selected pixel elements between the high reflectance and low reflectance states, so that the pixel elements are perceived by the viewer as an intermediate reflectance state.

Rather than simply mapping to a gray scale image, the conversion of the image data to reflectance data may involve a more sophisticated data conversion. For example, reflectivity of the pixel elements of the display surface may be selected so that the superposition of pixel element reflectivity and the content of the projected image combine to yield a desired quality of the resulting reflected light. The calculation of the appropriate reflectance data by the reflectance processor may be based in part on a non-linear combination of reflectivity and reflected color as may typically occur in a viewer's eye.

The display controller may include a data transmission path 34 for transferring the reflectance data from reflectance processor to the electrode controller. The data transmission system may include a hardwire connection, or may be a wireless data connection. Where the data connection is a hardwire connection, the hardwire connection may be a cable, in a local area network or a large area network. Alternatively, the data connection may include a wireless connection that utilizes modulated radiation, typically an infrared or rf (radio frequency) signal.

Electrode controller 32 is configured to be responsive to the method of data transmission used by the reflectance processor, and includes at least an address system 36 for electrically addressing the individual pixel elements in the display surface. Where data transmission occurs over a hardwire connection, the electrode controller may be localized and interpret the reflectance data for all or for a part of the display surface before addressing the electrodes of the projection screen. Alternatively, the electrode controller may be delocalized, and include individual electrode controllers that may be associated with one or several pixel elements, so that each individual electrode controller may receive the reflectance data for only those pixel elements associated with that electrode controller.

Figure 4:
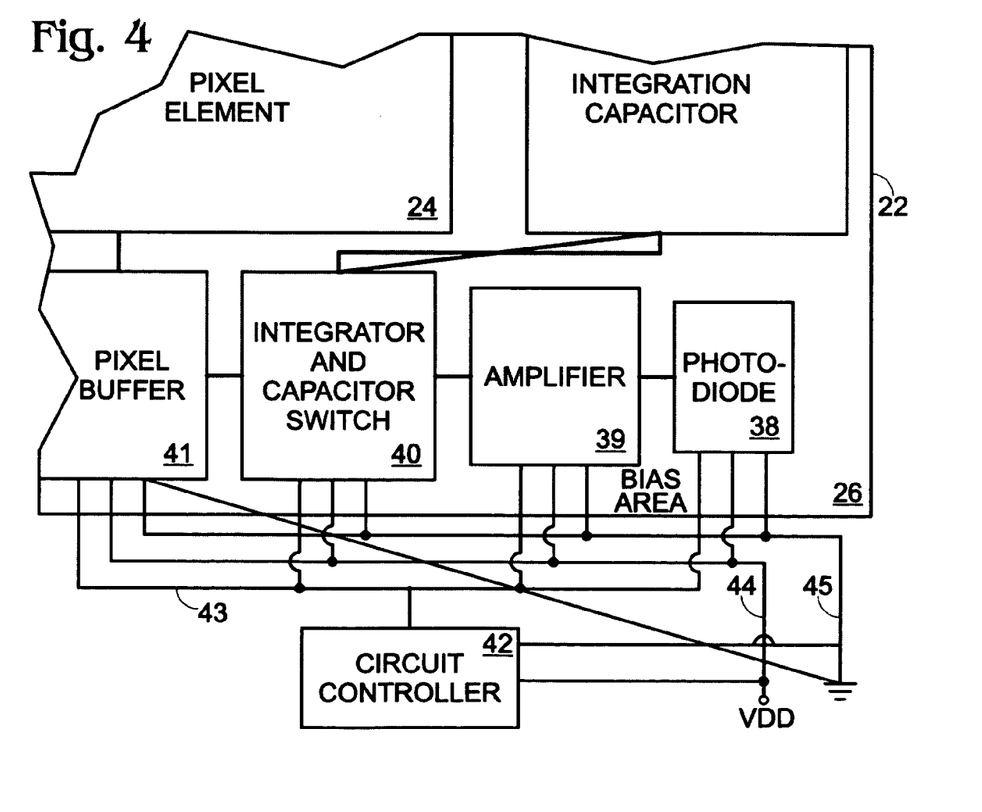
FIG. 4 is a partial schematic view of a display element of the display surface of FIG. 2.

Data transmission path 34 may include spatial addressing, and may correspond to a nonvisible control image projected onto the display surface, typically simultaneously or sequentially with the visible projected image, such that the display surface changes reflectivity in response to the nonvisible image. A nonvisible image typically includes electromagnetic radiation at a wavelength outside the conventional visible bands. For example, the nonvisible control image may include infrared radiation, microwave radiation, etc. A nonvisible control image is particularly useful, for example, outdoors where the ambient light level may be similar to or higher than the light levels of the visible projected image. The control image may be generally representative of the intensity distribution of the visible image. In particular, the control image may be an infrared image that is projected by the light engine of the projector.

Where the electrode controller is delocalized and spatially addressed, the electrode controller may include a plurality of photodetectors associated with individual pixel elements. Each photodetector may control a current under illumination within a predetermined light frequency range, at typical operating temperatures such as room temperature. The photodetector may be incorporated in a layer situated adjacent to the active layer. If the photodetector elements are substantially opaque and the pixel elements are substantially transparent, then the photodetector may be situated behind the active layer. If the photodetector itself is substantially transparent, the photodetector may be situated in front of the active layer. As shown in FIG. 4, the photodetector may be incorporated in the bias region 26 of the display element.

Also as shown in FIG. 4, bias area 26 may include circuitry capable of controlling the reflectivity of the associated pixel element in response to illumination of that display pixel. This circuitry may include one or more photodetectors 38 (such as a photodiode or other photosensitive element) that may be connected to an amplifier 39. Amplifier 39 may amplify the charge or the current controlled by the photodetector. Amplifier 39 may be connected to one or more capacitors. The capacitors may be used to integrate the current controlled by the photodetector (or amplifier 39), while an additional circuit may switch between two integration capacitors. The first integration capacitor 40 may integrate photodetector current, while the second integration capacitor 41 may determine the bias to be applied to pixel element 24 (that is, determine the reflectance state to be exhibited by that pixel element in order to coordinate with the projected image). Alternatively, or in addition, the current from the photodetector may be compared to a reference current to determine illumination of the photodetector by the control image. The circuit may also include an amplifier to buffer the voltage signal from the second capacitor into the pixel element itself (pixel buffer 41). The circuitry in bias area 26 may also reverse the polarity of the applied bias onto the pixel element, while maintaining a voltage amplitude that may be proportional to the integrated current from the photodetector.

In another embodiment, the pixel element capacitor and integration capacitor may be exchanged, eliminating the issue of charge sharing between the two capacitors. Alternatively, the circuit may be unsynchronized. That is, the current from the photodetector may be averaged, and the pixel element activated according to a preset threshold value. This circuit may represent a simpler configuration for the spatially addressed distributed electrode controller.

In yet another embodiment, the display element includes a photodetector layer connected in series with an associated pixel element. In this configuration, the pixel element may act as a capacitance, while the photodetector may act as a controller of current reaching the capacitance. The resulting layer of components may include one or more planar electrodes, for example at the front or rear of the display element. These planar electrodes may be used to bias alternately high and low potentials, in synchrony with the projected image. In operation, the control image may include an appropriate frequency of light with a desired intensity and duration to permit a desired quantity of charge to accumulate on, or be removed from, the pixel element. Alternatively, or in addition, a shunt capacitor may be connected in parallel with the pixel element, for example localized within the bias region, in order to accommodate enhanced ranges of pixel element capacitance and photodetector gain.

The electrode controller may include a circuit controller 42 that may determine any of a variety of operational parameters, particularly timing parameters. The circuit controller may determine start and end times for integration of the photodetector current, the time to switch integration capacitors, and the time to adjust the reflectivity of an associated pixel element, among others. The circuit controller may be centralized, such that there is a single circuit controller for the projection screen. Alternatively, each display element may include an associated circuit controller, for example included in bias area 26. The circuit controller may alter some or all of the circuit parameters using information communicated from the projection device, either via wireless data transmission, as discussed above, or via manual user controls such as, but not limited to, potentiometers. The circuit controller may then control the additional components of the electrode controller via circuit controller trace 43.

Projection screen 14 may include a power source for the display elements, as well as for the electrode controller. The power source is represented in FIG. 4 by traces 44 (providing an electrical potential relative to ground) and trace 45 (a common ground). Traces 44 and 45 may include one or more individual power traces. The power source may be incorporated into the projection screen itself, for example as one or more batteries, or the projection screen may utilize an external power supply. The power traces may optionally incorporate connections between the circuit controller and individual pixel elements. Such connections may be used to synchronize the sensing, integration and capacitor swapping times between the pixel element and the associated circuit controller, or to facilitate self test routines either by the manufacturer, or as a routine step upon powering up the screen itself.

Photodetector 38 may be responsive to visible light. The control image may be the projected image itself, provided that the projection screen is configured to change the reflectance state of the active layer only when the intensity of the light of the incident control image reaches a pre-determined intensity level. This pre-set intensity level may be above the ambient light level in the wavelengths used, assuring that in the regions of the display surface where only ambient light is incident on the screen, the screen will remain dark, thereby improving the contrast of the image. Optionally, a potentiometer or other adjusting mechanism may be provided to adjust the threshold light level at which the pixel elements change reflectance state, so that the screen can provide good contrast under a range of ambient light conditions. The adjusting mechanism may be manual, or alternatively, an automatic adjusting mechanism may be provided, such as an electronic circuit having a light sensor, for example.

The display surface may be adapted such that the reflectance properties of the screen change in response to only a control image that may be incident on the screen within a predetermined angle of incidence. In this example, the angle of incidence of the visible image and the control image may be different, such that the reflectance properties of the screen change in response to the control image. The control image may be inverted with respect to the projected visible image, such that maxima in intensity in the visible image correspond to minima in the infra red image. Accordingly, a projection screen may be similarly used where the reflectance decreases with increasing light intensity.

Once a particular reflectance state of the pixel element has been established, it may remain in that reflectance state until changed by the electrode controller. The reflectance may be "refreshed" by the display controller (either directly or via optical addressing), or the electrode controller may be configured such that the reflectance state will not change until specifically altered by the display controller.

It will be understood that the intensity of a control image is not necessarily required to be proportional to intensity of the visible image at each point. The functional relationship between the intensity of the control image and that of the projected image may be nonlinear in order to compensate for a situation where the reflectance of the screen in the visible range may not be proportional to the intensity of invisible light incident upon it. The use of such a projected control image offers several advantages. For example, where the control image projector is correctly aligned with the visible image projector, calibration of the display surface with the projected image may be largely automatic.

Where the screen is responsive to the visible projected image itself, that is where the control image is a visible image, it should be appreciated that the projection screen may be used in combination with any of a variety of projection systems, including overhead projectors (digital or conventional) and film projectors, such as motion picture projectors or slide projectors. The contrast of the resulting projected image may be enhanced without the requirement of a separate digital feed or digital signal being sent to the screen.

Alternatively, as discussed above, the projector may be adapted to project an invisible control image onto the screen and the screen may be adapted so that the reflectance at different points on the screen is determined at least in part by the light intensity of the control image at those points. The control image may then be used to increase the contrast of a visible image projected coincidentally with the control image. Alternatively, the projector may only project a control image, and the control image may be used to modulate the reflectance of ambient light on the screen, so that ambient light reflected from the screen forms an image representative of the control image.

The control image and the projected image may be projected onto the screen by separate projectors, in which case the projection system may include a main projector for projecting a visible image and a control projector for projecting the control image. In order to achieve an optimally effective contrast, the invisible control image may be provided at a higher resolution than the visible image.

A projector may project the control image onto the front of the screen, in which case the reflectance of the screen will be controlled by the control image. Alternatively, a control image projected onto the back of the screen may be used to control the reflectance on the front side of the screen, so that a visible reflected image may be formed thereon.

The projection system may be used to produce a color image. In one embodiment, to produce an image that is in color, the projector will be adapted to project a sequence of monochrome images, each monochrome image having a different single color, where the monochrome images are projected one after another sufficiently rapidly that they are perceived as a single image having a plurality of colors. The control image may be projected sequentially with the visible projected color images. For example, where the light engine of the projector utilizes a color wheel to provide the sequential color images, an infrared filter element may be added to the color wheel so that an additional infrared signal may be projected in sequence with the visible projected image.

Where the control image is invisible, visible light which is uniform or which carries a different pattern to the control image may be projected onto the screen to form a visible display corresponding to a representation of the control image. Since the image is formed by changing the reflectivity of the screen rather than by light emission, this yet further aspect of the invention provides a simple way of viewing an invisible image.

Figure 5:
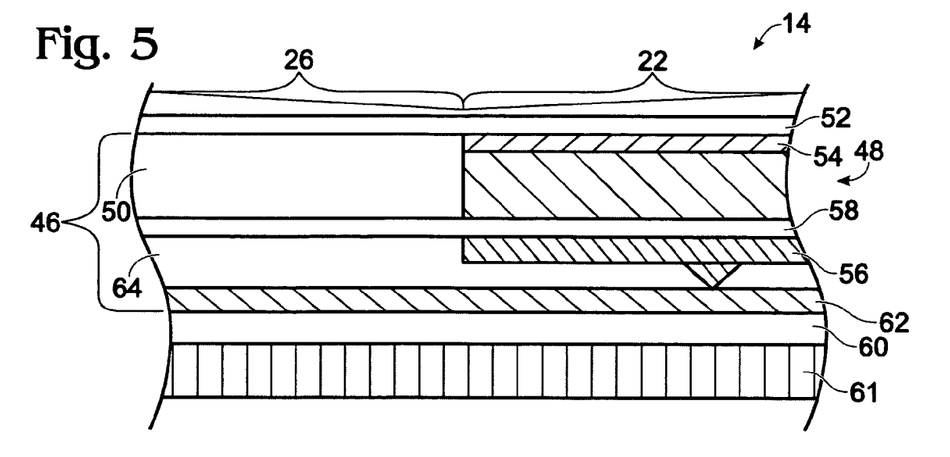
FIG. 5 is a partial schematic sectional view of the projection screen of FIG. 2.

As depicted schematically in FIG. 5, projection screen 14 may include an active layer 46 that incorporates a plurality of pixel elements 48. The projection screen section shown in FIG. 5 includes a portion of a display element 22 as well as a portion of bias region 26. The portions of the projection screen corresponding to bias region 26 may exhibit a fixed reflectivity, in particular layer 50 of bias region 26 may include a pigment, dye, or other colorant, or a passive light scattering material, for example such as glass beads, or a retroreflective substance, so as to enhance the reflectivity of the passive bias region. The presence of a reflective bias region may provide an enhanced reflectance range for the projection screen, when compared to a similar projection screen without such a bias regions. Each bias region may be sized so that is below the threshold of resolution for a typical viewer at a normal viewing distance from the screen.

A clear protective surface 52 may cover some or all of the projection screen. As discussed above, each pixel element typically includes at least a first electrode 54 for applying an electric field to the pixel element. As shown in FIG. 5, electrode 54 may be an optically transparent electrode in or near the front wall of pixel element 48. The pixel element may optionally include a second electrode 56, so that a voltage applied between the first and second electrode establishes the necessary electrical field within the pixel element. In the embodiment shown in FIG. 5, the second electrode is positioned beneath a rear wall 58 of the pixel element. It should be appreciated that rear wall 58 may include a reflective surface, particularly where pixel element 48 includes an electrophoretic cell. The projection screen may also include a buffer layer 60, and optionally a backing layer 61. Where circuitry 62 is incorporated in the projection screen, for example, circuitry used to power and/or address the electrodes associated with the pixel elements, that circuitry may be surrounded by an interlayer dielectric 64 (or ILD).

The pixel elements of the projection screen may be configured to exhibit differential reflectivity upon the application of an appropriate voltage to the pixel element. The applied voltage may establish an electric field within the pixel element sufficient to effect an electrostatically dependent change in reflectance characteristics. The pixel elements may incorporate a variety of structures and compositions to effect the electrostatically dependent change in reflectance, including without limitation electrochromic materials (including tunable dye molecules), interference effects, interrupted total internal reflectance (TIR), electrophoretic cells, twisting particle cells, or any combination thereof.

It should be appreciated that while a perfect contrast in reflectivity between the high reflectance state and the low reflectance state may be theoretically possible, most actual pixel elements exhibit contrast levels somewhat less than the hypothetical maximum. An ideal contrast level would be equivalent to the difference between pure white (100% reflection) and pure black (100% absorption). The use of an actual pixel element creates a practical contrast level that is somewhat less. Total internal reflection-based devices offer substantial contrast levels, while pigmented particle-based devices offer somewhat narrower contrast ranges. In turn, liquid crystal-based pixel elements may offer a less dramatic contrast than particle-based devices. However, any pixel element construction that offers a detectably differentiable contrast when illuminated by incident light is a suitable pixel element construction for the purposes of this disclosure. The overall display surface reflectivity may be determined by combining the reflectivity of the bias area, when present, and the reflectivity of the pixel elements.

In one example, the pixel elements of the projection screen may include one or more electrochromic materials. Such materials may change color or transparency when subjected to an appropriate electric field. The pixel element may include a liquid crystal composition, configured so that imposition of a suitable electric field changes the reflectivity of the pixel element by changing the light scattering properties of the liquid crystal. Liquid crystal-based pixel elements may include one or more light polarizers to enhance the differential contrast exhibited by the pixel element.

Where the pixel elements of the display device utilize total internal reflectance, each pixel element may include one or more retroreflective units configured to exhibit total or substantially total internal reflection of incident light when in a high reflectance state. The low reflectance state of the pixel element is typically created by interrupting or disrupting the conditions necessary for total internal reflectance, for example by light absorbance or light scattering. For example, the pixel element may incorporate one or more three-faceted corner reflectors that exhibit internal reflectance when a gap exists between the reflector and a substrate. For such a pixel element, the electrostatically-triggered elimination of such a gap disrupts the total internal reflectance of the pixel element, thereby establishing the low reflectance state. In an alternative example, the pixel element may incorporate an array of light fibers oriented substantially perpendicular to a reflective surface, that exhibit internal reflection unless the light is absorbed, for example by electrophoretically attracting light-absorbing materials to the surfaces of the fibers to disrupt reflectance at the surfaces.

The pixel elements may be constructed so that the reflectance of the pixel elements depends upon the disposition of pigmented particles within the pixel element. As used herein, pigmented particle includes any discrete particulate substance having a selected reflectivity. The pigmented particle may be inherently colored, or may be colored due to the presence of dyes, stains, and/or pigments applied to either the surface or within the particle. The pigmented particle may possess any of a variety of geometries and reflectivities. Disposition of the particles, as used herein, refers to either the orientation of the particle within the pixel element, or the location of the particle within the pixel element, or any combination thereof. The appropriate disposition of the particles to achieve the desired reflectivity typically is accomplished by establishing an appropriate electrical field within the pixel element in order to orient the polarized, pigmented particle in the desired position or configuration.

For example, a variety of thin films utilizing pigmented particles for differential reflectivity have been described for use in portable displays, electronic signage, or so-called 'electronic paper' (e-paper). Such display types may include, but are not limited to, electrophoretic displays, twisting-ball displays, and twisting-cylinder displays.

Electrophoretic pixel elements, as used herein, include pixel elements that incorporate cells filled with a suspension matrix in which the pigmented particles are suspended. The electrophoretic cells may be switched between a first state and a second state through application of an appropriate voltage between the electrodes. The first and second states may be selected to exhibit substantially different reflectivities.

Figure 6:
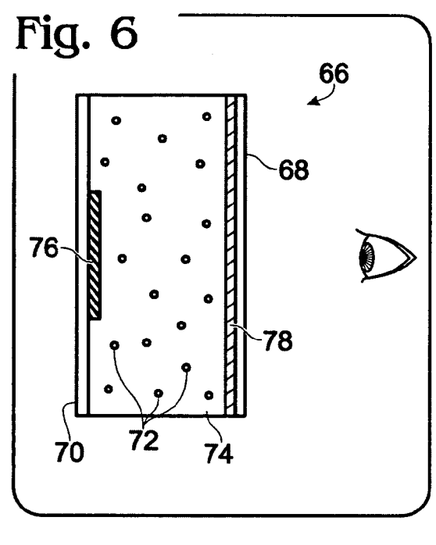
FIG. 6 is a sectional view of an electrophoretic display cell in a dispersed state.
Figure 7:
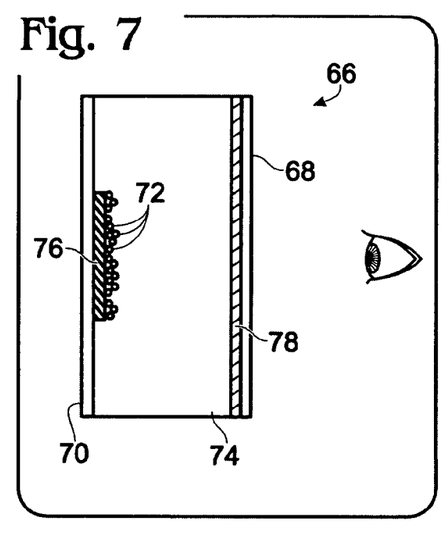
FIG. 7 is a sectional view similar to FIG. 6, but with the electrophoretic display cell in a condensed state.

As will be appreciated, the two states may correspond to a distributed state and a condensed state. For example, as shown in FIGS. 6 and 7, electrophoretic cell 66 includes a substantially transparent front wall 68, a rear wall 70, and pigmented particles 72 in suspending fluid 74. As shown in FIG. 6, the pigmented particles may be evenly dispersed throughout the suspending fluid, corresponding to the distributed state of the cell. Application of an appropriate voltage between electrode 76 and counter electrode 78 may result in the generation of an electric field within the electrophoretic cell, with the resulting migration and immobilization of particles 72 adjacent electrode 76, as shown in FIG. 7, corresponding to the condensed state. As will be appreciated upon reading further, the overall reflectivity of the cell may be mediated by switching between these states.

In one embodiment, suspending fluid 74 may be substantially transparent, and the overall reflectivity of the cell in the distributed state may be related to the reflectivity of pigmented particles 72. Correspondingly, the overall reflectivity of the cell in the condensed state may be related to the reflectivity of rear wall 70. Where the reflectivity of the pigmented particles differs from the reflectivity of the rear wall, it will be appreciated that it is possible to selectively alter reflectivity of the cell by switching between the distributed and condensed states.

Alternatively, where suspending fluid 74 may include opaque dyes or pigments, such that when the particles are distributed throughout the fluid (the cell is in the distributed state), the reflectivity of the cell may be largely determined by the reflectivity of the suspending fluid. In this embodiment, the condensed state may correspond to collecting the pigmented particles along and against front wall 68, so that the cell exhibits the reflectivity characteristics of the particles. The pigmented particles alternatively may be disposed against the front wall by migration to electrode 78. Where an electrode or counter electrode is incorporated in or adjacent to front wall 68, such an electrode is typically substantially transparent (such as may be fabricated with indium-tin-oxide or a similar conductor) in order to accommodate viewing of the particles through the electrode. Although for the sake of simplicity the electrodes of FIGS. 6–9 are depicted as being in contact with the suspending fluid, typically the electrophoretic cell includes an insulating layer between the fluid and each electrode. The insulating layer may protect the electrode, and/or protect the suspending fluid, and help prevent undesired color changes, electrical shorts, or loss of electrical connection. Such insulating layers may include, without limitation, polyester, polypropylene, polystyrene, polycarbonate, and polyimide layers. Alternatively, the insulating layer may include an inorganic inert dielectric, such as without limitation silicon oxide, silicon nitride, or silicon carbide. Where an insulator such as silicon dioxide is used, the insulating layer may require patterning in order to prevent cracking of the layer.

The pigmented particles may be substantially white, substantially black, or virtually any other color that imparts the desired reflectivity. Similarly, the suspending fluid may be transparent, or contain any suitable suspended or dissolved pigment or dye. Where the suspending fluid is transparent, as described above, the color of the rear wall of the electrophoretic cell may be determinative of reflectivity, and similarly may be white, black, or any other suitable color. For reasons which should be apparent, the reflectivity of the rear wall may be selected so as to contrast with the selected color of the particles.

The pigmented particles generally have a uniform size and low density. The particles may be prepared from any substance that permits the modification of the particle surface in order to make the particle suitably response to an electric field in the dielectric media, and therefore produce the desired electrophoretic mobility. For example, the particles may include cross-linked polymers, and may feature surface modifications such as derivatization by ionic or ionizable functional groups such as carboxylate groups, sulfonate groups, vinyl alcohol groups, etc. In selected embodiments of the invention, the pigmented particles may be uniformly black in color, or uniformly white in color.

It should be appreciated that, by careful design of the electrodes in the electrophoretic cell, the disposition of the particles in the cell may be controlled to a high degree. The electrodes may be planar, or may be linear. They may be localized along a front wall, along a rear wall, or along a side wall. One or more electrodes may be placed where two walls meet. Multiple populations of pigmented particles having contrasting reflectivities and contrasting electrophoretic mobilities may be combined in a single electrophoretic cell, such that one set of particles exists in a dispersed state while the other exists in a condensed state. A variety of disparate electrophoretic cell geometries, electrode configurations, and particle type may be envisioned without departing from the present disclosure.

Figure 8:
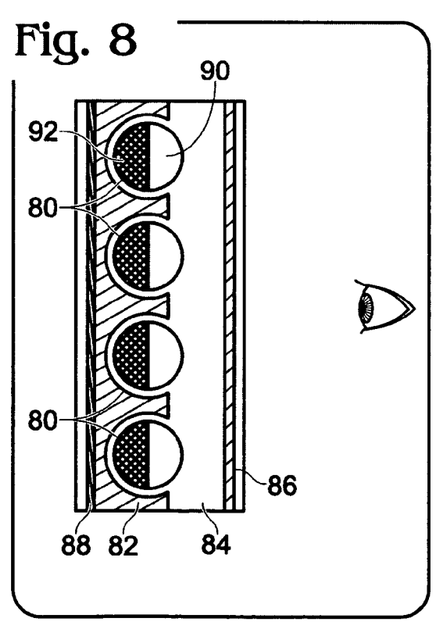
FIG. 8 is a sectional view of a twisting-ball display cell in a high reflectance state.
Figure 9:
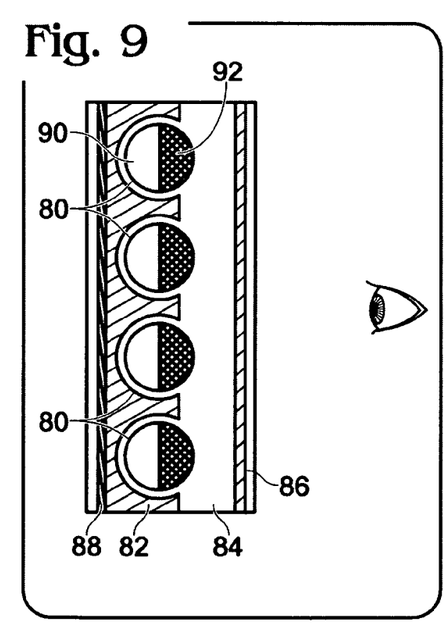
FIG. 9 is a sectional view similar to FIG. 8, but with the twisting-ball display cell in a low reflectance state.

Gyricon displays, such as twisting-ball and twisting-cylinder displays, utilize a plurality of particles having optical and electrical anisotropy. That is, discrete sections of the surfaces of the particles exhibit different colors and possess different electrical charges. An exemplary cell from a twisting-ball display is shown in FIGS. 8 and 9. Spherical particles 80 typically are embedded in a solid substrate 82. The slight space between each particle and the substrate typically is filled with a fluid 84, so that the particles are able to rotate in place in response to a changing electrical field created by application of an appropriate voltage between upper electrode 86 and lower electrode 88. The cell thus presents a darker or a lighter face as desired. It should be appreciated that the resolution of such a gyricon display (that is, the size of a given pixel element) is determined by the size of the electrodes controlling the orientation of the particles.

Particles 80 may be spherical, and are typically at least bichromic, having a white portion 90 and a black portion 92, such that by selection of the appropriate applied electrical field, either the white surfaces (FIG. 8) or the black surfaces (FIG. 9) are presented to a viewer, thereby providing for altering of the overall reflectivity of that particular pixel element. Although not required to be strictly black and white, typically, the particles include hemispheres of strongly different color, so as to enhance the contrast in reflectivities displayed.

Figure 10:
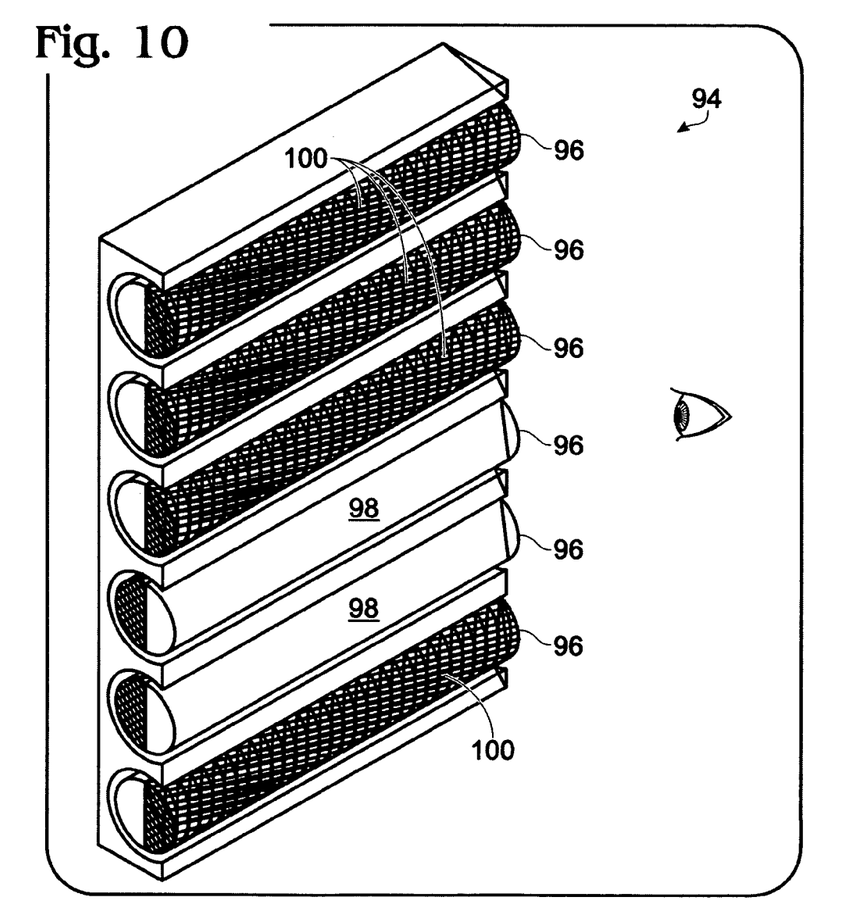
FIG. 10 is an isometric view of a twisting-cylinder display cell in a mixed reflectance state.

Alternatively, the display cell may include particles that are cylindrical in shape as shown in the twisting-cylinder display cell 94 shown in FIG. 10. Similar to a twisting-ball display, the individual cylinders 96 rotate in response to applied electrical fields to present a lighter region 98 or a darker region 100 to an observer.

Such twisting ball or twisting cylinder displays are typically prepared by mixing the optically and electrically anisotropic particles with an uncured material such as an elastomer. Following heat curing of the elastomer-particle mixture, the cured elastomer-particle sheet may be placed in a plasticizer fluid, generally a dielectric plasticizer, which is absorbed by the elastomer thereby causing the elastomer material to swell, and creating a void or cavity around each of the optically and electrically anisotropic particles which do not substantially absorb the plasticizer fluid. These voids or cavities become filled with the plasticizer fluid which may cause the encapsulated particles to acquire an electric charge such that, upon the application of an electric field across selected portions of the elastomer, the particles within those portions of the elastomer may rotate within their cavities to present a surface having the desired reflectivity.

Display surfaces that utilize electrophoretic displays or twisting-ball displays typically consume very little power. Therefore, an active projection screen utilizing such displays would typically have very low power demands, and may potentially be powered using batteries. For example, even a sizable screen may be powered for months by a few conventional AA batteries.

The active layer of the display surface may be a 'normal mode' active layer, which is in a decreased reflectance state when an electric field above a threshold value is applied and in an increased reflectance state when an electric field below the threshold value is applied. Alternatively, a 'reverse mode' active layer may be used which is in an increased reflectance state only when an electric field above a threshold value is applied. It may be desirable that the particles exhibit a substantial threshold for switching between states so as to minimize the complexity of the electrical switching equipment. Similarly, the use of additional electrodes to impose memory on the particle configuration may be useful.

In one embodiment of the projection screen, the pixel elements may be switched between a high-reflectance state, typically white, to a low-reflectance state, typically black. With appropriate pixelation, an array of black and white pixel elements may be used to create gray scale shading. Alternatively, the display surface may include a plurality of colored pixel elements including, but not limited to, red pixel elements, green pixel elements, blue pixel elements, yellow pixel elements, white pixel elements, etc. Each pixel element may display the selected color either by displaying all or part of pigmented particles, or in the case of electrophoretic pixel elements, by revealing the rear surface of the electrophoretic display cell.

Alternatively, the display surface may incorporate pixel elements having a plurality of selectable color characteristics. In one embodiment, such as has been described for twisting-cylinder displays, the pigmented particles exhibit multiple colored zones that may be individually presented to the viewer. For example, the cylinder may feature white, black and red regions, or may incorporate red, green, and blue regions. Alternatively, the display surface may incorporate a plurality of distinctly colored pixel elements, such as red pixel elements, green pixel elements and blue pixel elements, typically arranged in columns and rows such that each pixel element is adjacent a different-colored pixel element.

A multiple color display surface, particularly one having red, green, and blue color elements, may be used to reproduce color images, and therefore may enhance not only the contrast of a color image projected thereon, but the color content of the projected image as well. It should be appreciated that where a control image is used to coordinate the reflectivity of the projection screen, each color pixel element may include a receiver configured to receive the appropriate colored control light.

In order for the reflectivity of the projection screen and the projected image to be fully coordinated, it may be desired that the display system be calibrated before use. Such calibration may be simplified where the electrode controller employs a control image, and where the control image and the projected image utilize the same optical pathway. In most instances, calibration will be effective to accurately coordinate the reflectivity of the display surface with the projected image.

A variety of calibration methods may be utilized. Calibration may be automatic upon powering up the display system, or upon manual activation of a calibration feature, such as via an operator interface. The calibration procedure may include the projection of a test image with simultaneous generation of a test reflectance pattern, facilitating the appropriate alignment of the projected image on the projection screen, either by adjusting the projector, the screen, or the control image projector when used. The calibration procedure may include detecting ambient light levels using photodetectors incorporated in the projected screen in order to compensate for non-uniform light levels across the screen. It should be understood that a variety of other calibration methods may be used without departing from the scope of the instant invention.

The projection screen of the invention may be a generally planar sheet, as is typically the case for projection displays. However, as the display surface itself may be incorporated in a flexible sheet, the screen may take virtually any shape or configuration, including curved forms, and also be considered a display surface as referred to herein.

Figure 11:
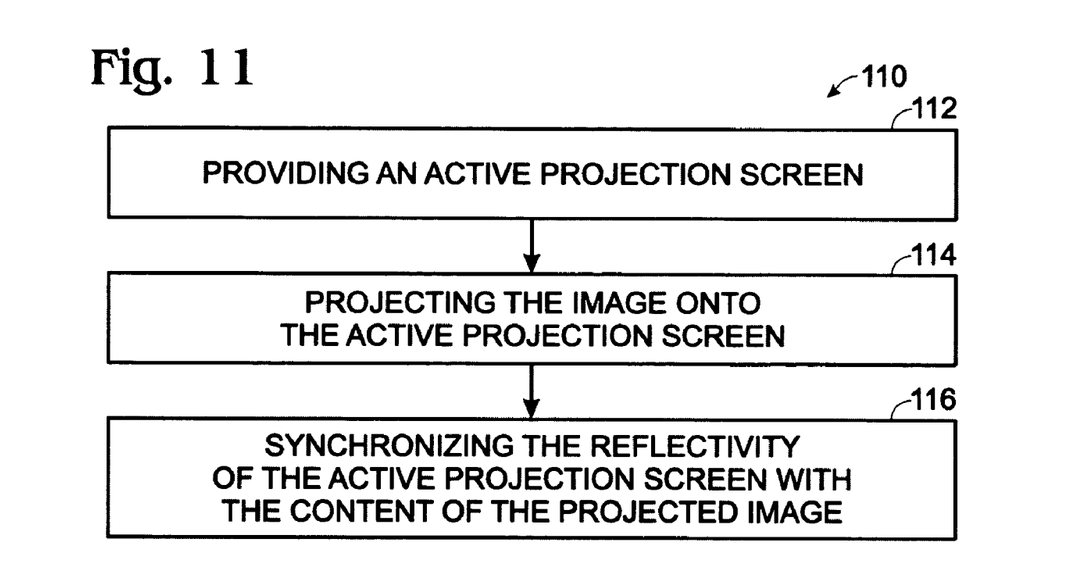
FIG. 11 is a flowchart depicting a method of synchronizing reflectivity of an active projection screen with the content of a projected image, according to an embodiment of the invention.

It should be appreciated that the display system described herein is well-suited for use in a method of synchronizing the reflectivity of an active projection screen with the content of a projected image, as set out in flowchart 110 of FIG. 11. The illustrated method includes providing an active projection screen (112), projecting the image onto the active projection screen (114), and synchronizing the reflectivity of each pixel element with the content of the portion of the projected image (116).

Figure 12:
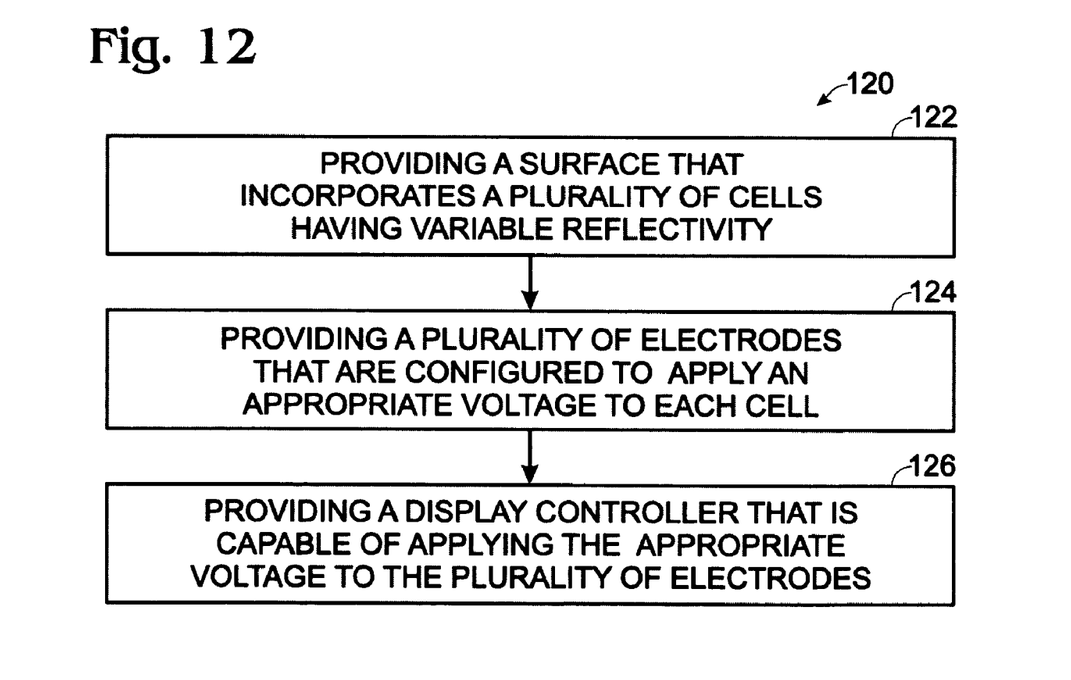
FIG. 12 is a flowchart depicting a method of making an active projection screen, according to an embodiment of the invention.

Similarly, a method of making an active projection screen is provided, as depicted in flowchart 120 of FIG. 12, that includes providing a surface that incorporates a plurality of cells (122), where each cell includes one or more pigmented particles, providing a plurality of electrodes (124) that are configured to selectively and independently apply an appropriate voltage to each cell, and providing an electrode controller (126) that is capable of applying the appropriate voltage to the plurality of electrodes.

While various alternative embodiments and arrangements of an active projection screen, and a method and system for enhancing the contrast of a projected image have been shown and described above, it will be appreciated by those of skill in the art that numerous other embodiments, arrangements, and modifications are possible and are within the scope of the invention. In other words, those skilled in the art will understand that many variations may be made therein without departing from the spirit and scope of the invention as defined in the following claims. The present description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding two or more such elements.

What is claimed is:

1. A projection screen for displaying a projected image, comprising:
 a display surface having display regions, with individual of the display regions having an optical property that may be changed by applying an appropriate voltage to the individual of the display regions,; and
 a reflectance processor and at least one electrode controller associated with each of the display regions and configured to coordinate the optical property of each of the display regions with content of a corresponding portion of the image.

2. The projection screen of claim 1, where the optical property includes reflectivity, and the projected image is reflected on the projection screen.

3. The projection screen of claim 1, where the optical property includes transmissivity, and the projected image is transmitted through the projection screen.

4. The projection screen of claim 1, where the projection screen includes a plurality of electrodes associated with the plurality of display regions, and where the display regions are configured so that application of the appropriate voltage to the electrodes changes the optical properties of the associated display regions.

5. The projection screen of claim 4, further comprising a display controller including the reflectance processor and the at least one electrode controller.

6. The projection screen of claim 4, where each display region includes one or more pixel elements, each pixel element including a plurality of pigmented particles and a suspension matrix, and where the application of the appropriate voltage changes the reflectivity of the pixel element by changing the disposition of the particles within the suspension matrix.

7. The projection screen of claim 6, where the application of the appropriate voltage collects the particles adjacent at least one electrode.

8. The projection screen of claim 4, where each display region includes one or more pixel elements, each pixel element including a plurality of at least bichromic particles so that the application of the appropriate voltage changes the orientation of the particles within the pixel element.

9. The projection screen of claim 8, where the at least bichromic particles include a black face and a white face.

10. The projection screen of claim 1, where each of the at least one electrode controller is responsive to a control image projected onto the display region associated with the at least one electrode controller.

11. The projection screen of claim 10, where the control image includes infrared radiation.

12. The projection screen of claim 10, where each of the at least one electrode controller includes a photodetector.

13. The projection screen of claim 4, where each of the at least electrode controller is configured to detect ambient light levels using the photodetectors and to adjust display region optical properties to compensate for non-uniform light levels across the projection screen.

14. A display system, comprising:
 a projector configured to project an image;
 a projection screen including:

a plurality of pixel elements, where the pixel elements are configured so that the optical properties of a particular pixel element may be altered; and a display controller configured to modify pixel element optical properties to coordinate with a portion of the image incident on that pixel element by projecting a control image as nonvisible radiation.

15. The display system of claim 14, where the display screen includes an electrode controller that is responsive to the nonvisible radiation.

16. The display system of claim 14, where the optical properties of the pixel elements depend upon the disposition of pigmented particles within the pixel element.

17. The display system of claim 16, where the pigmented particles are optically and electrically anisotropic.

18. The display system of claim 14, where the pixel elements include electrophoretic cells.

19. The display system of claim 14, where the pixel elements incorporate a plurality of selectable color characteristics.

20. A method of making an active projection screen, comprising:

providing a surface that incorporates a plurality of cells, each of the plurality of the cells configured to have an optical property varied; and providing a display controller including a reflectance processor and at least one electrode controller associated with each of the plurality of cells, with the display controller capable of coordinating the optical property of each of the plurality of cells with an optical characteristic of a portion of an image projected thereon.

21. A method of coordinating the optical properties of a screen with a projected image, comprising:

providing a screen having display regions, each of the display regions including one or more pixel elements incorporating a plurality of selectable color characteristics, and each of the display regions configured so that one or more optical properties of each of the display regions are individually controllable;

projecting the projected image onto the screen; and synchronizing the one or more optical properties of each of the display regions with an optical characteristic of a portion of the projected image projected onto a corresponding one of the display regions.

22. The method of claim 21, where synchronizing the optical properties of each of the display regions includes applying nonvisible radiation to each of the display regions which is indicative of an optical characteristic of the portion of the projected image projected onto the corresponding one of the display regions.

23. The method of claim 21, where synchronizing the optical properties of each of the display regions includes transmitting image data to each of the display regions using a hardwire connection, the Image data being indicative of an optical characteristic of the portion of the projected image projected onto the corresponding one of the display regions.

24. A projection screen, comprising:

means for displaying a projected image, including a plurality of optical elements;

means for changing the optical properties of each optical element means for coordinating the optical properties of each optical element with a corresponding portion of the projected image by projecting a control image as nonvisible radiation with the control image based on content of the corresponding portion of the projected image.

\* \* \* \* \*

UNITED STATES PATENT AND TRADEMARK OFFICE
CERTIFICATE OF CORRECTION

PATENT NO. : 7,072,108 B2 Page 1 of 1
APPLICATION NO. : 10/976222
DATED : July 4, 2006
INVENTOR(S) : Cruz-Uribe et al.

It is certified that error appears in the above-identified patent and that said Letters Patent is hereby corrected as shown below:

In the Claims

Col. 16 (line 19), delete "Image" and insert therefor --image--.

Signed and Sealed this

Twelfth Day of June, 2007

JON W. DUDAS
*Director of the United States Patent and Trademark Office*